United States Patent
Döhring et al.

(10) Patent No.: US 8,835,809 B2
(45) Date of Patent: Sep. 16, 2014

(54) HEATABLE COVERING SYSTEM

(75) Inventors: Dieter Döhring, Zabeltitz (DE); David Macher, Voitsberg (AT); Gerhard Kremer, Fürstenfeld (AT)

(73) Assignee: Kronoplus Technical AG, Niederteufen (CH)

( * ) Notice: Subject to any disclaimer, the term of this patent is extended or adjusted under 35 U.S.C. 154(b) by 1160 days.

(21) Appl. No.: 12/514,160

(22) PCT Filed: Nov. 10, 2006

(86) PCT No.: PCT/EP2006/010822
§ 371 (c)(1),
(2), (4) Date: Nov. 11, 2009

(87) PCT Pub. No.: WO2008/055535
PCT Pub. Date: May 15, 2008

(65) Prior Publication Data
US 2010/0089899 A1    Apr. 15, 2010

(51) Int. Cl.
H05B 3/10 (2006.01)
F24D 13/02 (2006.01)

(52) U.S. Cl.
CPC .................... F24D 13/024 (2013.01)
USPC ........................................................ 219/213

(58) Field of Classification Search
USPC ........................................................ 219/213
See application file for complete search history.

(56) References Cited

U.S. PATENT DOCUMENTS

| | | | |
|---|---|---|---|
| 3,594,545 A | 7/1971 | Green | |
| 3,697,728 A | 10/1972 | Stirzenbecher | |
| 4,616,125 A * | 10/1986 | Oppitz | 219/553 |
| 4,814,580 A | 3/1989 | Carageorge | |
| 6,092,587 A * | 7/2000 | Ingram | 165/56 |
| 6,737,611 B2 | 5/2004 | Ek et al. | |
| 7,183,524 B2 * | 2/2007 | Naylor et al. | 219/528 |
| 2006/0086717 A1 * | 4/2006 | Oosterling | 219/528 |
| 2007/0209729 A1 * | 9/2007 | Tomerlin et al. | 138/133 |

FOREIGN PATENT DOCUMENTS

| | | |
|---|---|---|
| DE | 1816641 | 7/1970 |
| DE | 1940702 | 2/1971 |
| DE | 2143710 | 6/1973 |
| DE | 10052345 | 5/2002 |
| EP | 1055087 | 5/2002 |
| JP | 10274420 | 10/1998 |
| WO | 96/26984 | 9/1996 |
| WO | 02/31290 | 4/2002 |
| WO | 2004/099530 | 11/2004 |

OTHER PUBLICATIONS

English translation to the International Preliminary Report on Patentability for corresponding application No. PCT/EP2006/010822.
International Search Report for corresponding application No. PCT/EP2006/010822 completed Jul. 2, 2007.

* cited by examiner

*Primary Examiner* — Marc Armand
(74) *Attorney, Agent, or Firm* — Renner, Otto, Boisselle & Sklar, LLP

(57) ABSTRACT

The present invention relates to a heatable covering system for floors, ceilings, and walls. The covering system comprises covering panels which at least on one longitudinal edge comprise coupling means in order to be able to join covering panels with each other wherein the covering panels are provided with electrical heating means and have electrical contacting means in order to electrically contact the panels.

29 Claims, 6 Drawing Sheets

HEATABLE COVERING SYSTEM

The present invention relates to a heatable covering system for floors, ceilings and walls according to the preamble of claim 1. A further aspect relates to a heating means for a covering system.

For heating of floor surfaces, different methods are known from the prior art. A popular floor heating consists of a number of pipes or tubes, which are arranged meander-shaped across a floor and through which a heating fluid, usually hot water, streams. Onto these heating pipes or tubes, the real floor cover, for example a parquet or tile floor, is laid and which is heated by means of the hot pipes.

Floor heatings are panel heatings which allow a uniform and therewith comfortable heat distribution. However, conventional floor heatings, like the above described, are expensive with respect to material costs and also with respect to its installation and which normally can be only installed by accordingly trained experts.

From the European patent EP 105 5 087 B1, a heatable covering system for floors is known, which consists of a number of metal plates in which channels are incorporated. The metal plates are laid on a floor in such a manner that the channels are connected with each other. Then, into these channels a heating cable is meander-shaped inserted. The heating cable is self-adjusting and provided with an integrated thermal protection in order to eliminate the risk of excessive heating. Onto the metal plates and the heating cable which is arranged in the channels within the plates, then, a usual floor cover, for example ceramic tiles, can be laid.

From the U.S. Pat. No. 6,737,611 B2, an electrically conducting mat is known, which heats itself while applying a potential. The mat consists of a semi-crystalline polymeric and an electrically conducting fill material and due to its small thickness can be laid below a floor cover. The heat mat is flexible and is offered in a rolled-up condition. During laying the heat mat, it has only to be un-rolled above a floor and accordingly fixed and electrically connected.

An object of the invention is to provide a heatable covering system for floors, ceilings and walls by which the covering panels are provided with electric heating means. Further, it is an object of the invention to be able to electrically connect such covering panels provided with electric heating means in an easy manner. A further aspect relates to an electric heating means for a covering system.

These and other objects, which during reading the following description will be named or can be recognized by a person skilled in the art, are solved by means of a heatable covering system according to claim 1.

In one embodiment, the heatable covering system for floors, ceilings and walls, comprises covering panels with a decorative top side and a bottom side, for example laminate floor panels. In this case, the covering panels are provided with coupling means at least on one longitudinal edge in order to be able to join covering panels with each other. The covering panels are provided with electrical heating means and the covering panels have suitable configured electric contacting means which allow an electric connection between the electric heating means of two and more covering panels. Preferably, the electric heating means are arranged at the bottom side of the covering panels, i.e. in the space between the covering panels and the floor or the wall which should be covered with the panels. In order to allow a as simple as possible electric connection between two panels, it is indented that the electric contacting means are arranged at least partially on the coupling means of the panels so that by means of connecting of corresponding coupling means of two panels also an electric connection between the electric heating means of these panels is producible.

In a preferred embodiment, the coupling means are provided as groove and tongue elements, which are provided complementary to each other so that a tongue can be inserted with its longitudinal edge of a first cover panel in a respectively provided groove at a longitudinal edge of a second cover panel. In order to be able to connect several cover panels with each other, the coupling means are preferably provided at least on two opposite longitudinal sides of the covering panels, wherein particularly always a groove lies opposite to a tongue. The coupling means preferably extend over the full length of a longitudinal side.

In order to achieve a good electric contact, the electric contacting means preferably extend over substantially the full length of the coupling means. In this manner, it is possible to cut the covering panel to any length in order to adopt them to the special lay-requirements without that the electric contactability is lost.

The contacting means consist, for example, of stripe-shaped electrically conducting elements. For example, they can consist of an electrically conducting metal foil, which consists of, for example, copper, aluminium or high-grade steel. In a further exemplary embodiment, the electrically conducting foil consists of tinned copper strip.

For mounting the contacting means onto the coupling means, for example, these can be pressed and/or glued on the coupling means. The applied adhesive material is preferably electrically conductive. In case the contacting means consist of strip-shaped electrically conducting elements, these are preferably pressed onto the coupling means in such a manner that they are fixed at the coupling means by means of a tight fit. In case the coupling means are made of complementary provided groove and tongue elements, the strip-like elements can be laid or pressed, respectively, for example, around the tip of the tongue. An advantageous adhesive connection can be realized, for example, by means of an adhesive tape, which preferably is adhesive on both sides. In this manner, it is possible to make the adhesive bonding of the contacting means on the coupling means easier, for example by applying the adhesive tape at first on the contact means, for example an electrically conducting metal foil and then by arranging and gluing the compound consisting of contacting means and adhesive tape on the coupling means. Of course, here it is also possible to press the contacting means additionally with the coupling means in order to achieve a even better conjunction between contacting means and coupling means.

In a particular advantageous embodiment, the coupling means consist of complementary provided groove and tongue elements and the contacting means of electrically conducting metal foil. The inner surfaces of the lower flank of the groove elements are thereby at least partially covered by an electrically conducting metal foil. By the tongue elements, the lower sides of the tongue elements are at least partially covered with a metal foil. In case, two covering panels with complementarily provided groove and tongue elements are mechanically connected with each other by inserting the tongue of the one covering panel into the groove of the other covering panel, in this manner simultaneously and beside any additional effort, an electric connection between two covering panels is achieved. As soon as the tongue of one covering panel is inserted into the complementarily provided groove of a further covering panel, even automatically and simultaneously, the electric connection by means of the electrically conducting metal foils arranged within the groove of one panel and at least partially on the tongue of the other panel is provided.

A further aspect relates to electric heating means for covering panels, which particularly can act good together with the above disclosed contact means. However, the heating means can also act together with other common contact means. The electric heating means of the covering panels preferably consists of a panel heating. This can be arranged on the top side or bottom side of the covering panels, however preferably it is arranged on the bottom side of the covering panel. If in the following the top side and bottom side of the covering panel is discussed, it should be clear that this does not necessarily mean that the electrical heating means are arranged as single layer at the bottom or top side of the covering panel or that they have to be arranged directly at the bottom or top side. On the contrary, further layers, particularly décor layers and abrasion-proof layers, can be provided at the top side and layers for sound-absorption or layers for thermal insulation at the bottom side can be provided.

The electric panel heating preferably consists of an electrically conducting thin film. For example, this can be built from electric resistance wires. The resistance wires can be provided, for example, by means of a web made of thin conducting copper wires, which warm up during electric application.

In a preferred embodiment, the electric panel heating consists of an electrically conducting coating. For example, the electric panel heating can be applied by means of spray coating, foil coating, doctor blade coating, screen coating or inkjet coating or a combination of these methods. Preferably, the electrically conducting coating is made of a fluid, which after coating the covering panels is preferably dryable. In a preferred embodiment, the electrically conducting fluid consists of graphite varnish or carbon varnish. Such varnish can be commercially obtained, for example, from the company CRC Industries GmbH, Germany. It is also, for example, possible that the fluid is provided with carbon or graphite particles in order to improve the electric conductibility and/or in order to make the fluid electrically conducting. In a further advantageous embodiment, the fluid comprises nano-scale electrically conducting particles or so called multi-walled-carbon-nano-tubes.

The energy supply should be happen with an alternating voltage less than 42 V, particularly with a voltage of 38 V. Thereby, the electrical power input is preferably not greater than 120 Watt per $m^2$. A covering system, which is provided with electrical heating means, is preferably provided with an automatic temperature control. Thereby, the temperature control keeps the surface temperature of the covering panel in the range of 18° C. to 32° C.

The covering panels can, for example, be laminate panels, veneer panels or parquet panels. Such covering panels are preferably used for flooring and are commercially obtainable in a variety of embodiments, qualities and sizes.

In order to increase the effectivity of a covering system with the disclosed electric heating means, below the heating means preferably an insolating layer for insolation is arranged. The insolating layer for insolation consists, for example, of an electrically non-conducting fleece. As material for the heat-insolation layer, practically all heat-insolating materials, which are usually used for interior construction and for the laying of floorings, are applicable. Thereby, also electrically conducting materials are conceivable; however, in this case they have to be electrically insolated from the heating system and from the electrical contact means. This, for example, can be done by means of a further electrically, non-conducting layer, which is arranged between insolating layer and possibly adjacent electrical contacting means or electrical heating means. In an exemplary embodiment, below the heating means, an insolating layer for insolation is arranged, which consists of an electrically non-conducting, non-woven fleece, having a thickness of more as 1 mm.

The electrical heating should have a sheet resistance between 100 to 500 W per $m^2$, particularly between 250 to 300 W per $m^2$. This is particularly true for the previously mentioned electrically operated panel heatings made of electrically conducting thin films, for example, layers made of resistance wires or electrically conducting coatings, for example, graphite varnish or carbon varnish.

In an advantageous embodiment, the bottom sides of the covering panels are provided with a sound-absorbing layer. From the field of laminate, veneer and parquet floorings, a person skilled in the art knows a number of sound-absorbing materials and laying methods therefore. The sound-absorbing layer can, for example, be arranged between the bottom side of the covering panel and the electrical heating layer. In an advantageous embodiment, the covering panel comprises a sound-absorbing layer and also a heat-insolating layer. Starting from the bottom side of the covering panel, the covering advantageously comprises the following layer system: a sound-absorbing layer; an electric panel heating, and a heat-insolating layer.

In the following, a detailed description of the figures is provided.

Figure 1:
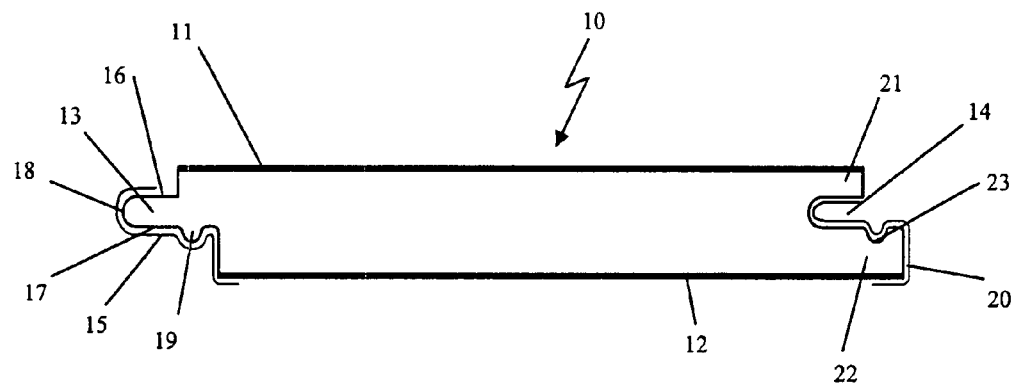
FIG. 1 shows a schematic cross-section view of a covering panel.
Figure 2:
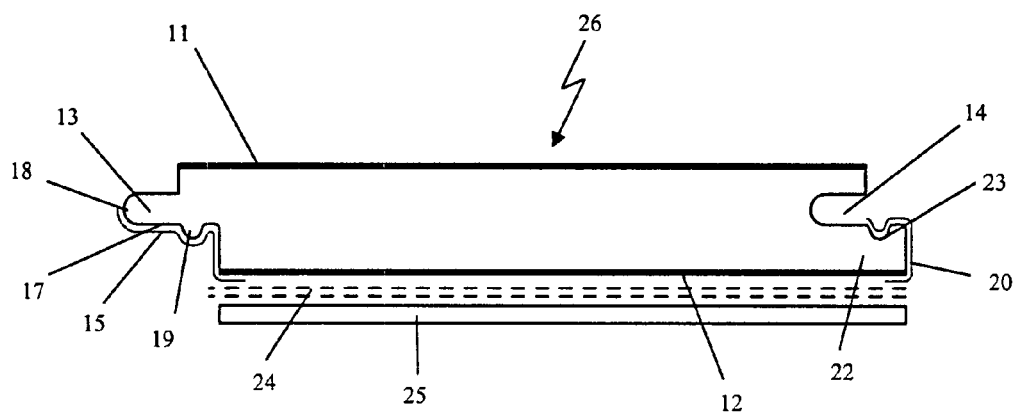
FIG. 2 shows a schematic cross-section view of a covering panel with an additional insolating layer.
Figure 3:
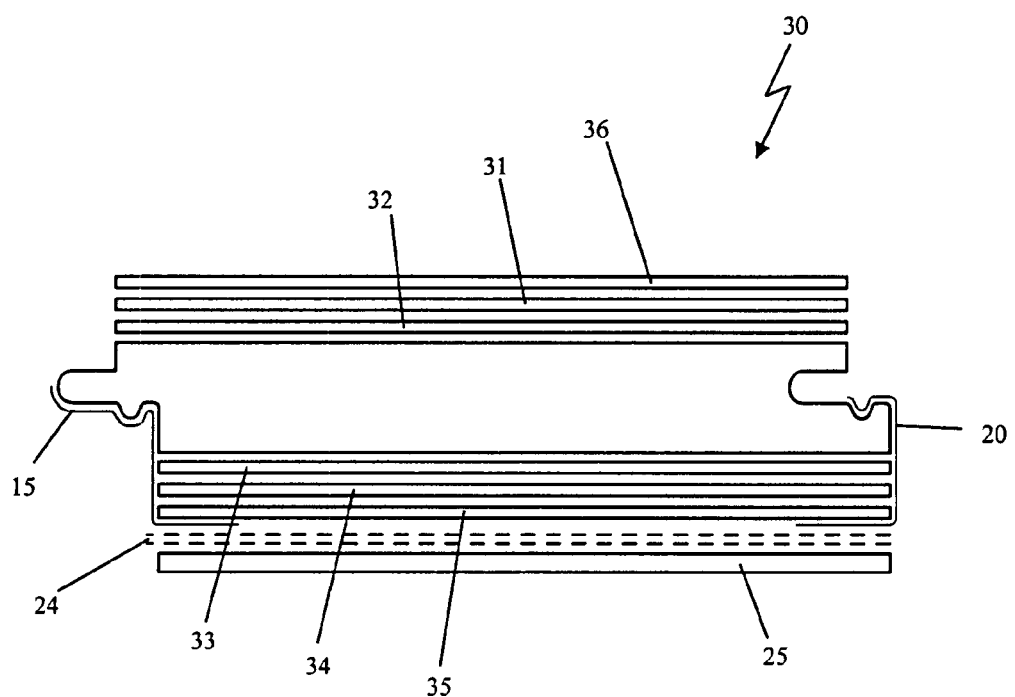
FIG. 3 shows a schematic cross-section view of a covering panel with a number of further layers.

In FIG. 1, a schematic cross-section view of an exemplary covering panel 10 is shown which is intended for use in a covering system. The exemplary covering panel 10 of the FIGS. 1 to 3 is a laminate panel for a floor. Such laminate panels usually have a rectangular shape wherein the both longitudinal edges are provided with groove and tongue elements. The short cross sides of such a covering panel can also be provided with similar or also with different coupling means. In this manner all four edges of the covering panels are provided with coupling means so that this can be connected in a covering system at all four sides with further covering panels in order to be able to cover a larger area. The covering panel 10 has a top side 11 and a bottom side 12. The top side 11 can be covered with further layers made of different materials. In case of the laminate panel this is usually at least a décor layer consisting of a printed special paper and an above arranged overlay layer which is particularly abrasive resistant and serves as protecting layer. At the bottom side 12 also further layers can be arranged, for example, layers for sound-absorbing or layers for heating-insolation. At both longitudinal sides of the covering panel 10 coupling means in the form of tongue 13 and groove 14 are provided. Tongue and groove are complimentarily to each other provided so that in case two covering panels 10 should be joint with each other, a tongue 13 of the covering panel can be inserted in a groove 14 of the other covering panel. The shown embodiment of tongue and groove is only exemplary and there are a large number of different tongue and groove shapes known from the prior art which can also be used with the present invention.

In the embodiment shown in FIG. 1, the tongue 13 is provided with contacting means 15. The contacting means 15 extends, following the shape of the tongue, from the top side 16 of the tongue around the tip 18 of the tongue over the bottom side 17 of the tongue to the bottom side 12 of the covering panel 10. The contacting means 15 is, for example, a thin strip of an electrically conducting material, for example, a thin copper strip. The strip is preferably so thin and flexible respectively that it can be curved around the shape of the tongue or the groove without big effort. The strip 15 preferably extends over the full length of the tongue, i.e. over the total length of the longitudinal side of the covering panel, in case the tongue extends over the total lengths.

The tongue 13 is provided with a latching protrusion 19 at its bottom side 17 which preferably extends over the total length of the tongue and therewith over the total length of the longitudinal edge of the covering panel 10. The complimentary provided groove 14, at the opposite side of the covering panel 10, has an upper flank 21 and a lower flank 22. Within the lower flank 22 a latching groove 23 extends, preferably also over the full length of the lower flank 22. As shown in FIG. 1, the lower flank 22 is slightly longer than the upper flank 21. In this manner, the inserting of the tongue 13 into the groove 14 is easier, in case two covering panels 10 with complementary provided groove and tongue elements are joined with each other. While inserting the tongue into the groove the latching protrusion 19 is pressed in the latching groove 23 in the lower flank 22 of the groove 14 which is preferably complementary provided. In this manner, two properly provided covering panels can be joined with each other particularly secure. Since, like shown, the contacting means 15 and 20 respectively are arranged at the coupling means, i.e. the tongue and also the groove, while joining two covering panels mechanically, an electrical connection between the electric contacting means 15 and 20 is automatically provided. Since the contacting means are again in electric connection with the heating means arranged on top or bottom side of the covering panel, like in the following will be described, also an electric connection between the electric heating means is created in a simple manner. Therefore, no addition hand grips or tools are necessary in order to provide also the electric contact between these panels, in addition to the mechanic latching. Therefore, such a provided covering system can be laid by layman.

In FIG. 2, a further embodiment of a covering panel 26 is schematically shown in cross-section. The same or similar parts are here and in the following figures provided with the same reference signs. The tongue 13 has electric contacting means 15 in form of a thin contact strip which is arranged at the lower side of the tongue 13 and which extends to the bottom side of the covering panel 26. The lower flank of the groove 14 is provided with a further contacting means 20 which extends also to the bottom side of the covering panel 26. In the embodiment of FIG. 2, the contacting means cover the coupling means, i.e. tongue and groove, only partially. As can be clearly seen in FIG. 2, nevertheless, an electric connection between two covering panels is provided in case the tongue 15 of a covering panel is inserted into a complementarily provided groove 14 of a further covering panel, since, in the present case, at least the latching protrusion at the tongue and the latching groove in the lower flank of the groove 14 is covered by the contacting means. At the bottom side of the covering panel 26 an electric heating means 24 which is in contact with the contacting means 15, 20 is arranged.

In the present case, the electrical heating means consists of an electric panel heating. This, for example, can be made of an electrically conducting thin layer which is built from electric resistant wires which are webbed in a carrier fleece. The electric panel heating can, however, also be made of an electrically conducting coating, for example, a coating made of graphite varnish or carbon varnish or a mixture thereof. Electrically conducting coatings can be made of, for example, a fluid, which, after the covering panels are provided with electric contacting means, is applied onto the bottom side of the covering panel. This can be provided, for example, by means of spray coating, coil coating, doctor blade coating, screen coating or inkjet coating or also by a combination of these methods. In order to increase the electric conductibility of such a fluid, carbon or graphite particles can be included. Below the heating means 24, an optional heat-insolating layer 25 is arranged which, for example, can be made of an electrically non-conducting fleece. In order to provide a good connection of the layers, this heat-insolating layer can be, for example, glued or sticked with the electric panel heating 24. The above described structure of the heating means can, of course, be provided with power by means of other respectively conventional contacting means wherein the herein described contacting means are preferred.

In FIG. 3 a schematic cross-section view of a further embodiment of a covering panel 30 is shown. At the top side of the covering panel 30 three layers are schematically indicated. The upper-most layer consists of an overlay 36, for example, a paper, which is provided with a phenol resin and abrasion resistant particles, for example, corundum particles, serving as protection layer. The middle layer is a décor layer 31, like usually used with laminate panels in order to give the panels the look of real wood parquet. An upper core layer 32 is arranged below.

Also at the bottom side of the covering panel 30 a layer system is arranged. The first layer at the bottom side of the covering panel 30 is a lower core layer 33. Below, a counter-strike paper 34 is arranged which should prevent a counter-strike of the laminate panel, i.e. of the covering panel 30. Below, a sound-absorbing layer 35, typically 0.3 mm thick, is arranged. The electric contacting means 15 and 20 extends partially over the bottom side of the covering panel 30 and rest partially onto the protective layer 35. Below the sound-protective layer 35 again, an electric heating means in form of a panel heating 24 is arranged. In FIG. 3 it can be clearly seen, like the ends of the contacting means 15, 20 are in contact with the panel heating 24. Below the panel heating 24, similar as in FIG. 2, an optional heat-insolating layer 25 is arranged. For a person skilled in the art it is clear that all layers are tightly bounded with each other in order to build a covering panel with a thickness of a few millimeters.

Figure 4:
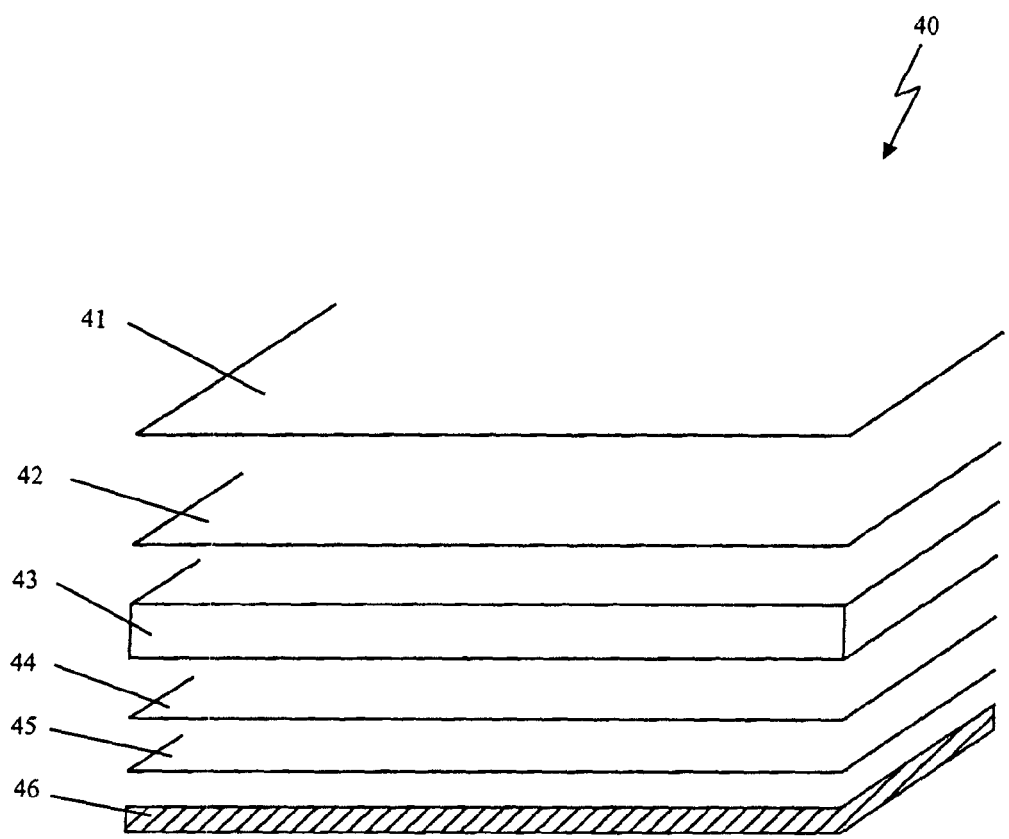
FIG. 4 is a schematic illustration of the layer structure of an embodiment of a covering panel.

In FIG. 4 the structure of a further laminate panel 40 is schematically shown. With reference sign 43 a carrier panel, for example made of HDF or MDF material, is characterised which builds the structure core of the laminate panel 40 as such. The upper-most layer is built by means of overlay and décor paper 41 respectively. Below a heating means in form of an electric panel heating 42 is arranged, i.e. between HDF-carrier panel and the overlay and décor paper 41 respectively. Below the carrier panel 43 a core layer made of natron paper 44 is arranged. Below, again, a counter-strike paper 45 and below a sound-absorbing layer 46 are arranged. As clear for a person skilled in the art, the electric contacting means are able to connect such a laminate panel by which the heating means 42 are arranged at the top side of the panel. For this purpose, the contacting means, like shown in FIG. 1, are simply directed to the top side of the covering panel so that they be in contact with the heating means. However, in this case, it is not necessary that the contacting means extends to the bottom side of the covering panel.

Figure 5:
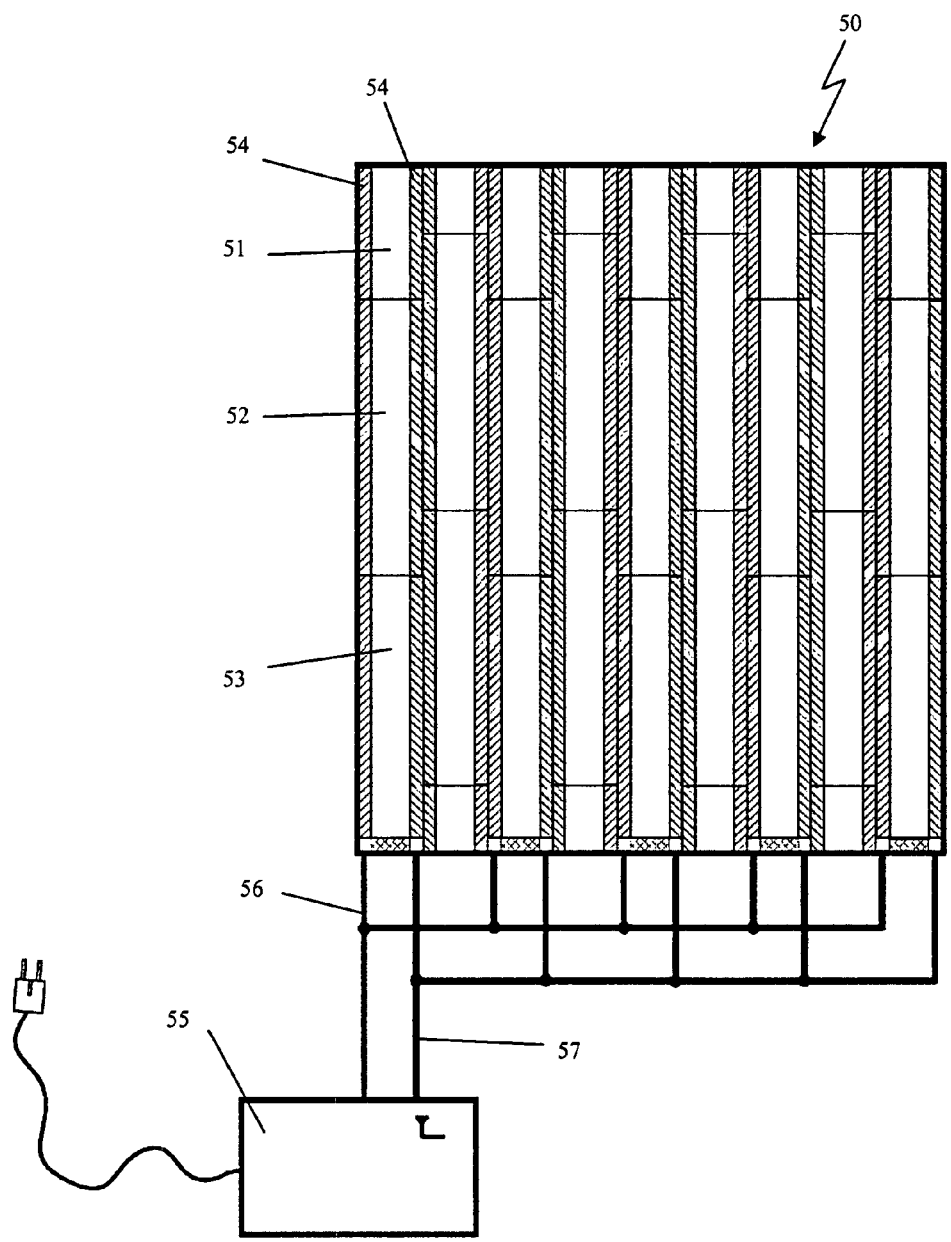
FIG. 5 is a schematic illustration of a covering system.

In FIG. 5 a heat-able covering system 50 is schematically shown. The covering system 50 consists of a number of covering panels, for example the covering panels 51, 52, and 53. As shown in FIG. 5, the covering panels are provided with electrical contacting means 54 which essentially extends over the total longitudinal sides of the covering panels. As can be seen clearly, some of the covering panels are shorter as others. In order to adapt the covering system in its shape to the respective occurrences, for example, a room in which the covering system should be laid. Since the electrical contacting means extends over the total longitudinal side of the covering panel, the covering panels can simply cut without that this has negative effects to the electric connectability of the panels. With reference sign 55 an electro module is indicated which provides the electric power supply for the heatable covering system 50. Such an inventiveness covering system has, among others, the advantage that it can be also laid by a layman due to the simply electrical connectability of the electrical heating means.

Figure 6:
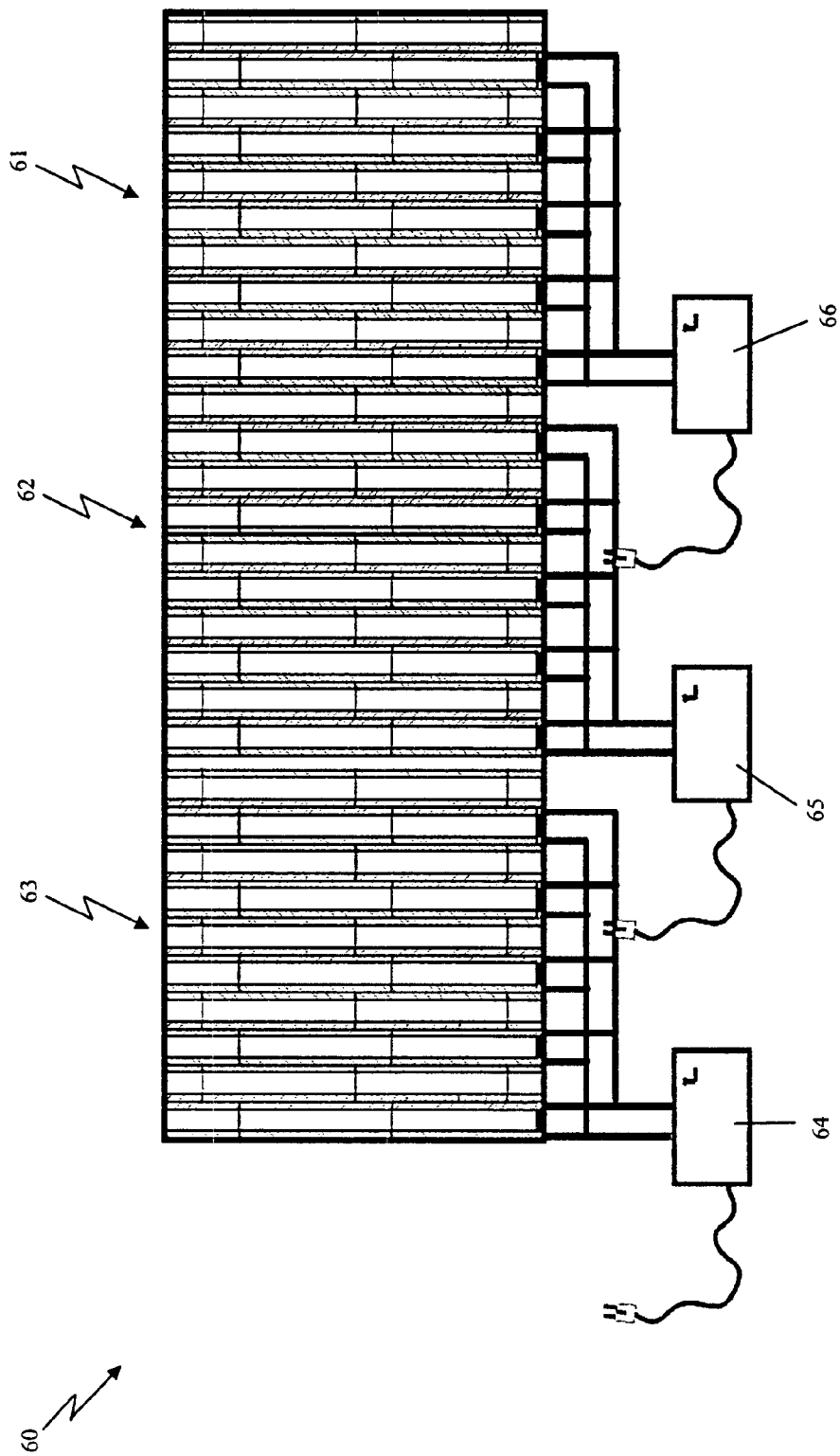
FIG. 6 is a further schematic illustration of a covering system.

In FIG. 6 a covering system 60 is illustrated which consists of a number of three separated covering systems 61, 62, and 63 which each has an own power supply 64, 65 and 66 respectively. The modular structure of the covering system 60 allows the use of more smaller power supply devices 64, 65, 66 instead of a single large device. In this manner, insolating transformers with a power of typically several 100 W, for example 700 W, can be used which can be connected and installed, respectively, also by a layman without particular qualification. By a typical area power of several 10 W per m² up to about 100 W per m², for example 10 m² area can be supplied by means of such small transformers. Furthermore, the power supply devices can be provided with a remote control and/or with temperature sensors in order to simplify the operating and the handling of the heatable covering system.

Figure 7:
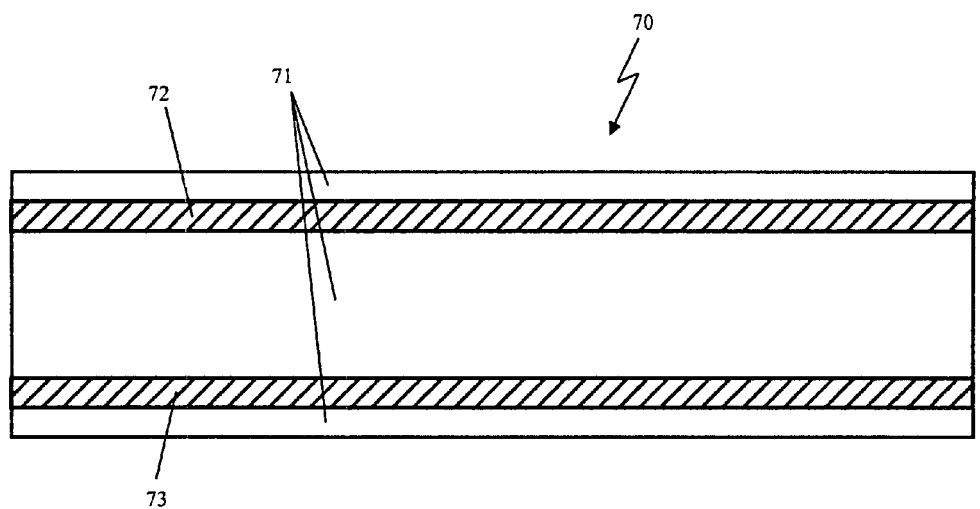
FIG. 7 is a schematic illustration an alternative electric contact means.

In FIG. 7 a schematic illustration of an alternative electrical contacting means is shown. FIG. 7 shows schematically a covering panel 70, looked from its bottom side. The covering panel 70 is provided with an electrical panel heating 71 which is provided according to the above disclosed electrical heating means. The electrical panel heating 71 is, for example, a thin film of an electrically conducting graphite or carbon varnish. On the panel heating 71 two electrical contacting means 72 and 73 are arranged. The contacting means 72 and 73 consists of, for example, a thin conducting metal strip which is tightly connected with the electric to panel heating 71, for example, glued. Also with this alternative manner, the herein described electrical heating means can be supplied with power. However, for a person skilled in the art, it is clear that also further alternatives exist which cooperate with the electrical heating means.

In periods in which it is not heated, an alternating power system with very reduced power output or in an interval manner can be used, whereby corrosion effects due to humidity or galvanic potential differences in electrically conducting contacting means can be avoided. This form of preventive protection is particularly recommended while using direct current.

The mounting of the electrical contacting means on the coupling means can be carried out in different manners. For example, contacting strips made of thin copper or aluminium or high quality steel can be used which are provided with an adhesive layer which preferably has electrically conducting characteristics. Thereby, at first the panel heating layer can be applied and subsequently the electrical contacting means can be applied or contrariwise. As materials for the electrical contacting means, for example, a conducting copper foil is suitable, for example, the "Conductor Copper Fuel Tape" VE1691 of the company D&M International, A-8451 Heimschuh. Further materials, for example, are from the company 3M Electrical Products Division, Austin, Tex., USA, for example, the type 1183.

In an alternative way of production an electrically conducting thin foil, for example, a copper or aluminium or high grade steel with optionally an applicable surface coating is applied, for example, onto the bottom side of a laminate panel at the edge in longitudinal direction. That followed, that thin foil is pressed onto or around the coupling means. The pressing preferably happens in such a manner that no steps on the passage between the foil and panel surface appears. After that a panel heating element can be applied onto the bottom side of the panel wherein the panel heating element gets into contact with at least a part of the foil. The electrical contact between the foil and heating means can be improved by an additional pressing. In addition, the contacting strips can be tint or nickel coated.

The electrical heating means can be used in form of an electrically conducting paste, paint or varnish, respectively with suitable viscosity and dry characteristics. For example, carbon or graphite pigments with a polymeric matrix can be used. Since such a heating layer is only a few micrometers thick, different thermal expansions between heating layer and the other components of the covering panel do hardly not play a role.

The herein described electrical heating means are particularly good applicable in order to be combined with the disclosed contacting means. However, as a matter of course, it is also possible to supply the heating means over conventional electrical contacting means with power so that the herein described electrical heating means can be used independent from the described contacting means.

The invention claimed is:

1. A heatable covering system for floors, ceilings and walls, comprising:
    covering panels each having a decorative top side and a bottom side;
wherein
    the covering panels comprising complementary edge couplers in order to join the covering panels to each other, and
wherein
    the covering panels each have electric heating means and an electric contact arranged at least partially at the coupler so that the contacts of two joined panels will establish an electrical connection between the joined panels, and
wherein
    the electric heating means includes a panel heating element in the form of an electrically conducting coating on each panel, the electrically conducting coating having been formed by applying an electrically conducting fluid onto the panel and drying the fluid, whereby the coating will be directly adhered to the panel.

2. The heatable covering system according to claim 1, wherein the electrically conductive coating is at the bottom side of the covering panels.

3. The heatable covering system according to claim 1, wherein the complementary couplers include complementary groove and tongue elements.

4. The heatable covering system according to claim 1, wherein the complementary couplers are provided on at least two opposite longitudinal sides of the covering panels.

5. The heatable covering system according to claim 1, wherein the electrical contact of each panel substantially extends over the full length of the coupler.

6. The heatable covering system according to claim 1, wherein the electrical contact of each panel includes a strip-shaped electrically conducting element.

7. The heatable covering system according to claim 1, wherein the electrical contact of each panel includes a conductive element pressed and/or glued on the coupler.

8. The heatable covering system according to claim 1, wherein the contacting means are attached to the coupling means by means of an adhesive tape.

9. The heatable covering system according to claim 1, wherein the couplers include complementary groove and tongue elements and the electrical contact of each panel includes an electrically conducting metal foil, wherein the metal foil of one panel covers at least partially the inner surface of a lower flank of the groove and the metal foil of the other panel covers at least partially the lower side of the tongue.

10. The heatable covering system according to claim 1, wherein the electrically conducting coating is formed of graphite lacquer or carbon lacquer or of a mixture thereof.

11. The heatable covering system according to claim 1, wherein the electrically conducting coating was applied by means of spray coating, coil coating, doctor blade coating, screen coating or inkjet coating or by a combination of these methods.

12. The heatable covering system according to claim 1, wherein the electrically conducting coating is provided with carbon or graphite particles in order to improve the electric conductivity.

13. The heatable covering system according to claim 1, wherein the electrically conducting coating comprises nano-scale electric conducting particles or multi-walled-carbon-nano-tubes.

14. The heatable covering system according to claim 1, wherein energy supply is carried out with an alternating voltage smaller than 42 volt.

15. The heatable covering system according to claim 1, wherein a power input of 120 watt/m² is not exceeded.

16. The heatable covering system according to claim 1, wherein the covering system is provided with an automatic temperature control.

17. The heatable covering system according to claim 1, wherein the covering panels are laminate panels, veneer panels or parquet flooring panels.

18. The heatable covering system according to claim 1, wherein each panel includes thermal insulating layer.

19. The heatable covering system according to claim 1, wherein thermal insulating layer is arranged underneath the coating.

20. The heatable covering system according to claim 1, wherein below the heating means an thermal insulating layer is arranged, which thermal insulating layer consists of an electrically non-conducting nonwoven fleece, having a thickness of more than 1 mm.

21. The heatable covering system according to claim 1, wherein the heating means has a sheet resistance of 100 to 500 Ohm/quadrate.

22. The heatable covering system according to claim 1, wherein the bottom side of the covering panel is provided with a sound-absorbing layer.

23. The heatable covering system according to claim 1, wherein, starting from the bottom side of the covering panel, the following layer system is arranged:
   a sound-absorbing layer;
   the electric heating means;
   an insulating layer.

24. The heatable covering system according to claim 6, wherein the electrical contact of each panel includes an electrically conducting metal foil.

25. The heatable covering system according to claim 12, wherein the electrically conducting coating is provided with carbon or graphite particles in order to make the coating electrically conducting.

26. The heatable covering system according to claim 16, wherein the automatic temperature control holds the surface temperature of the covering panels in the range of 18° C. to 32° C.

27. The heatable covering system according to claim 19, wherein the sound-absorbing layer is arranged beneath the electrically conducting coating.

28. The heatable covering system according to claim 24, wherein the electrically conducting metal foil is formed of copper, aluminium or high grade steel.

29. The heatable covering system according to claim 24, wherein the electrically conducting metal foil includes a tinned copper strip.

* * * * *